United States Patent [19]
Desmond et al.

[11] Patent Number: 5,820,245
[45] Date of Patent: Oct. 13, 1998

[54] REARVIEW MIRROR ASSEMBLY

[75] Inventors: John P. Desmond; Sean McCormack, both of Newbridge; Patrick J. Lawlor, Clontarf, all of Ireland; Rick Mousseau, Holland, Mich.

[73] Assignee: Donnelly Corporation, Holland, Mich.

[21] Appl. No.: 634,333

[22] Filed: Apr. 12, 1996

[30] Foreign Application Priority Data

Dec. 11, 1995 [IE] Ireland ...................................... 950937

[51] Int. Cl.⁶ ............................. B60Q 1/26; B60Q 1/00; F21V 33/00
[52] U.S. Cl. ............................ 362/83.1; 362/61; 362/80; 362/135; 362/140
[58] Field of Search .............................. 362/74, 80, 80.1, 362/83.3, 83.1, 61, 135, 140; 359/604

[56] References Cited

U.S. PATENT DOCUMENTS

| | | | |
|---|---|---|---|
| D. 289,989 | 5/1987 | Skogler et al. | D12/188 |
| D. 300,312 | 3/1989 | Skogler et al. | D12/188 |
| D. 328,587 | 8/1992 | Arbisi | D12/187 |
| D. 351,370 | 10/1994 | Lawlor et al. | D12/187 |
| 3,059,539 | 10/1962 | Meade | 88/77 |
| 3,075,430 | 1/1963 | Woodward et al. | 88/77 |
| 3,152,216 | 10/1964 | Woodward | 88/77 |
| 3,543,018 | 11/1970 | Barcus et al. | 240/4.2 |
| 3,680,951 | 8/1972 | Jordan et al. | 350/281 |
| 4,443,057 | 4/1984 | Bauer et al. | 350/281 |
| 4,447,808 | 5/1984 | Marcus | 340/696 |
| 4,448,488 | 5/1984 | Nakaho | 350/278 |
| 4,488,777 | 12/1984 | Bauer et al. | 350/279 |
| 4,588,267 | 5/1986 | Pastore | 350/600 |
| 4,630,904 | 12/1986 | Pastore | 362/83.1 |
| 4,646,210 | 2/1987 | Skogler et al. | 362/142 |
| 4,669,825 | 6/1987 | Itoh et al. | 350/332 |
| 4,671,615 | 6/1987 | Fukada et al. | 350/331 |
| 4,676,601 | 6/1987 | Itoh et al. | 350/331 |
| 4,733,336 | 3/1988 | Skogler et al. | 362/142 |

(List continued on next page.)

FOREIGN PATENT DOCUMENTS

| | | |
|---|---|---|
| 0254435A1 | 1/1988 | European Pat. Off. . |
| 615882A2 | 9/1994 | European Pat. Off. . |
| 1292308 | 9/1962 | France . |
| 3437775A | 10/1984 | Germany . |
| 85262064 U | 9/1985 | Germany . |
| D8970 | 5/1994 | Ireland . |
| 61-7803 | 1/1986 | Japan . |
| 1136134 | 12/1968 | United Kingdom . |
| 1384714 | 12/1971 | United Kingdom . |
| 2192370 | 1/1988 | United Kingdom . |
| 2210836 | 6/1989 | United Kingdom . |
| 2211472 | 7/1989 | United Kingdom . |
| WO8202448 | 7/1982 | WIPO . |
| WO8401132 | 3/1984 | WIPO . |

OTHER PUBLICATIONS

Gentex Visions, Winter 1987, Gentex Corporation, Zeeland, Michigan.

Electrochromic Mirrors, Donnelly Corporation, Holland, Michigan, published more than one (1) year prior to filing of this application.

Photographs of Gentex Electrochomic Automatic Review Mirror, Gentex Corporation, Zeeland, Michigan, on sale in the U.S. as of 1989.

Primary Examiner—Sandra L. O'Shea
Assistant Examiner—Matthew J. Spark
Attorney, Agent, or Firm—Van Dyke, Gardner, Linn & Burkhart, LLP

[57] ABSTRACT

A rearview mirror for vehicles includes a mirror case, a reflective element, a support for mounting the assembly on a vehicle, at least one lamp assembly having a reflector member which substantially directs light in a predetermined direction in the vehicle, and a circuit board mounted within the mirror case and having at least one holder for holding a light source which projects into the reflector member. A lens provides shaping and directing properties for light emitting from different areas of the reflector and includes a prescription region which focuses light from the reflector member to a particular target area of the vehicle, and a second region having a prescription different from said first prescription region.

29 Claims, 11 Drawing Sheets

U.S. PATENT DOCUMENTS

| | | | |
|---|---|---|---|
| 4,741,603 | 5/1988 | Miyagi et al. | 350/357 |
| 4,781,436 | 11/1988 | Armbruster | 350/281 |
| 4,807,096 | 2/1989 | Skogler et al. | 362/142 |
| 4,882,565 | 11/1989 | Gallmeyer | 340/461 |
| 4,948,242 | 8/1990 | Demsond et al. | 350/637 |
| 5,178,448 | 1/1993 | Adams et al. | 362/83.1 |
| 5,193,029 | 3/1993 | Schofield et al. | 359/604 |
| 5,207,492 | 5/1993 | Roberts | 362/83.1 |
| 5,223,814 | 6/1993 | Suman | 340/525 |
| 5,394,138 | 2/1995 | Stephens | 340/463 |
| 5,481,409 | 1/1996 | Roberts | 362/83.1 |
| 5,521,760 | 5/1996 | De Young et al. | 362/83.1 |
| 5,590,948 | 1/1997 | Moreno | 362/83.1 |
| 5,634,709 | 6/1997 | Iwama | 362/80.1 |
| 5,649,756 | 7/1997 | Adams et al. | 362/83.1 |
| 5,659,423 | 8/1997 | Schierbeek et al. | 359/604 |
| 5,669,698 | 9/1997 | Veldman et al. | 362/83.1 |
| 5,671,996 | 9/1997 | Bos et al. | 362/83.1 |
| 5,673,994 | 10/1997 | Fant, Jr. et al. | 362/83.1 |

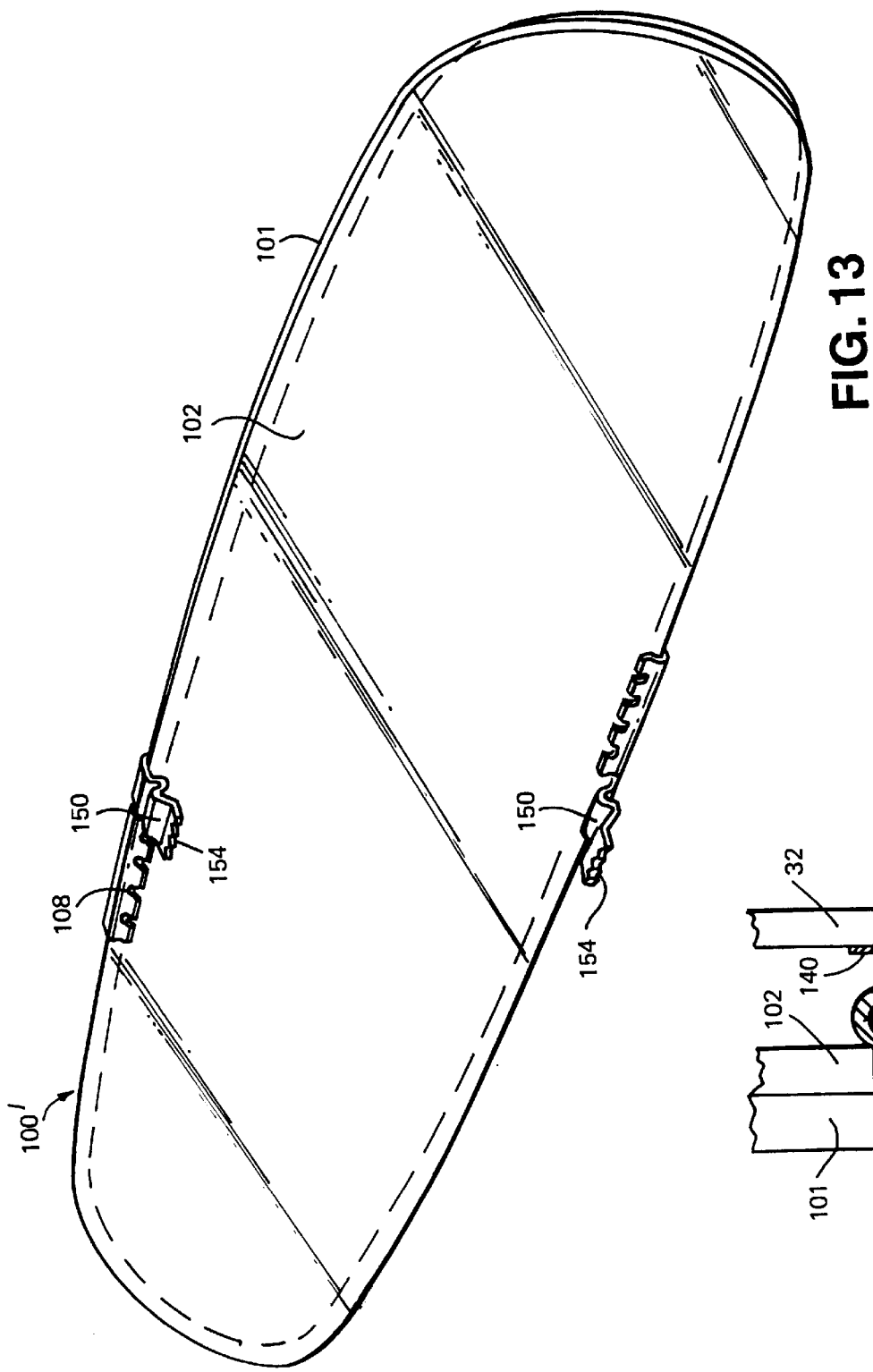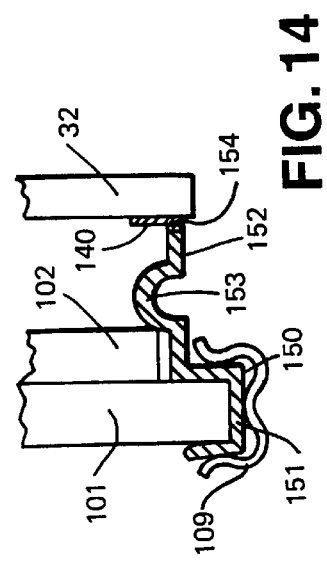

ns an electrical circuit for controlling the reflective condition of said reflective element and, most preferably, for continuously varying and controlling the reflective condition from a high reflective state to a low reflective state.

REARVIEW MIRROR ASSEMBLY

FIELD OF THE INVENTION

The present invention relates to rearview mirrors for vehicles.

In particular, the invention relates to electro-optic rearview mirrors, for example electrochromic rearview mirrors in which two glass plates sandwich an electrochromic medium. The invention also relates to interior vehicle rearview mirrors in which a prismatic type reflective element is utilised to provide both a high reflectivity day position and a low reflectivity night position.

BACKGROUND OF THE INVENTION

Electro-optic rearview mirrors are well known in the art for example, in U.S. Pat. No. 5,140,455 and U.S Pat. No. 5,151,816 and as described in the following paper: - N. R. Lynam "Electrochromic Automative Day/Night Mirrors" SAE Technical paper series (870636) (1987).

Prismatic type rearview mirrors are also well known in the art.

SUMMARY OF THE INVENTION

According to one aspect of the invention there is provided a rearview mirror assembly for a vehicle comprising; a mirror case including a reflective element; a support for mounting said assembly on a vehicle; at least one lamp assembly having a reflector member to substantially direct light in a predetermined direction in the vehicle.

Preferably the rearview mirror assembly further comprises: a circuit board mounted within the mirror case; said circuit board having at least one holder, for holding a light source; such that said light source projects into said reflector member.

Preferably said reflector member further comprises a lens mounted such as on the reflector member to substantially focus said light from said lamp assembly, to a predetermined region.

The reflector member preferably has an aperture for receiving said light source.

The light source is preferably a bulb.

Preferably the bulb projects laterally and downwardly into said reflector member.

More preferably the bulb projects downwardly at an inclined angle.

The circuit board preferably has a driver's side bulb holder and a passenger side bulb holder.

The reflector member is preferably removably mounted within said mirror case.

Further preferably the reflector member has at least one resilient flange for engaging a complementary flange in said mirror case to releasably mount said reflector member in said mirror case.

Preferably the lens optionally has a selected opaque area to reduce illumination in predetermined areas.

The circuit board preferably has mounted thereon at least one switch.

The reflective element is preferably actuatable between at least two reflective conditions.

Preferably the reflective element is an electro-optic rearview mirror element.

More preferably said electro-optic rearview element is an electrochromic element. The circuit board preferably con- A resilient means preferably abuts a rear surface of said reflective element.

Preferably a shock absorbing means abuts a rear surface of said reflective element.

More preferably said shock absorbing means comprises a layer of foam material adhered to a rear surface of said reflective element.

The foam material preferably comprises a cross-linked polyethylene foam.

The foam material preferably has an adhesive rear surface.

The circuit board is preferably attached to the adhesive rear surface.

Further preferably said lamp assembly is disposed on a bottom region of the mirror case.

The rearview mirror assembly is preferably provided with a first and a second lamp assembly.

The first and second lamp assemblies preferably comprise a driver's side lamp assembly and a passenger side lamp assembly respectively.

Further preferably said circuit board has a first electrical switch for controlling the reflective element and second and third electrical switches for controlling driver's side and passenger side lamp assemblies.

An electrical spring contact is preferably provided to electrically connect said circuit board to said reflective element.

The spring contact preferably abuts a flat electrical terminal on said circuit board.

According to another aspect of the invention there is provided a rearview mirror assembly for a vehicle comprising: a mirror case including a reflective element; a support for mounting said assembly on a vehicle; at least one lamp assembly having a reflector means to substantially direct light in a predetermined direction in the vehicle; said reflector means comprising a vacuum metalised reflector member.

Preferably the reflector member further comprises a lens, mounted on the reflector shell to substantially focus said light from said lamp assembly to a predetermined region.

The rearview mirror assembly for a vehicle further comprises: a circuit board mounted within the mirror case; said circuit board having at least one holder for holding a light source; such that the light source projects into said reflector member.

According to yet another embodiment of the invention there is provided a reflector member for a lighted rearview mirror, comprising: a peripheral flange for engaging with a mirror case; an interior surface of said member being reflective and comprising a generally flat front wall; a generally flat rear wall; one side of said rear wall curving towards and joining said front wall to define a first side wall; a generally concave topmost surface extending between said front and rear walls and sloping upwardly from said first side wall; a second side wall of generally concave shape joining said front and rear walls and extending upwardly and curving towards said topmost surface.

Preferably an aperture is provided in the member for receiving a light source.

The aperture is preferably provided in a region where the topmost and second side walls merge together.

According to another aspect of the invention there is provided a reflector means for a lighted rearview mirror comprising: a peripheral flange for engaging with a mirror case; an interior surface of said member being reflective and comprising: a generally flat front wall; a generally flat rear wall; said rear wall being of a substantially smaller height than said front wall; a first side wall extending upwardly and sloping over said front and rear walls; a generally concave topmost surface extending between said front and rear walls and sloping downwardly from an uppermost region of said first side wall to said peripheral flange.

Embodiments of the invention will now be described, by way of example, with reference to the accompanying drawings, in which;

BRIEF DESCRIPTION OF THE DRAWINGS

FIG. 13 is a perspective view of another embodiment of reflective element showing the spring contact; and FIG. 14 is a diagrammatic cross-sectional view of the reflective element showing the spring contact of FIG. 13.

DESCRIPTION OF THE PREFERRED EMBODIMENTS

Figure 1:
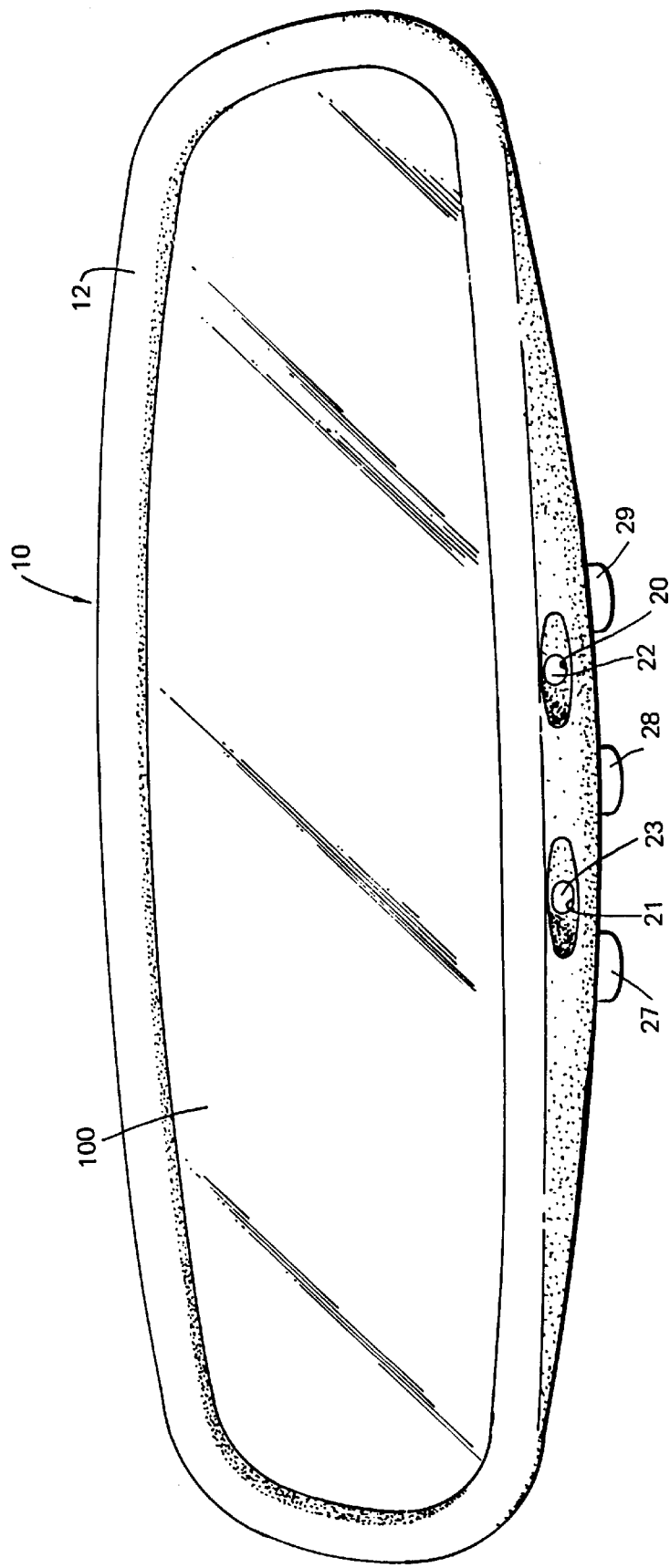
FIG. 1 is a front view of a rearview mirror assembly according to the invention.
Figure 2:
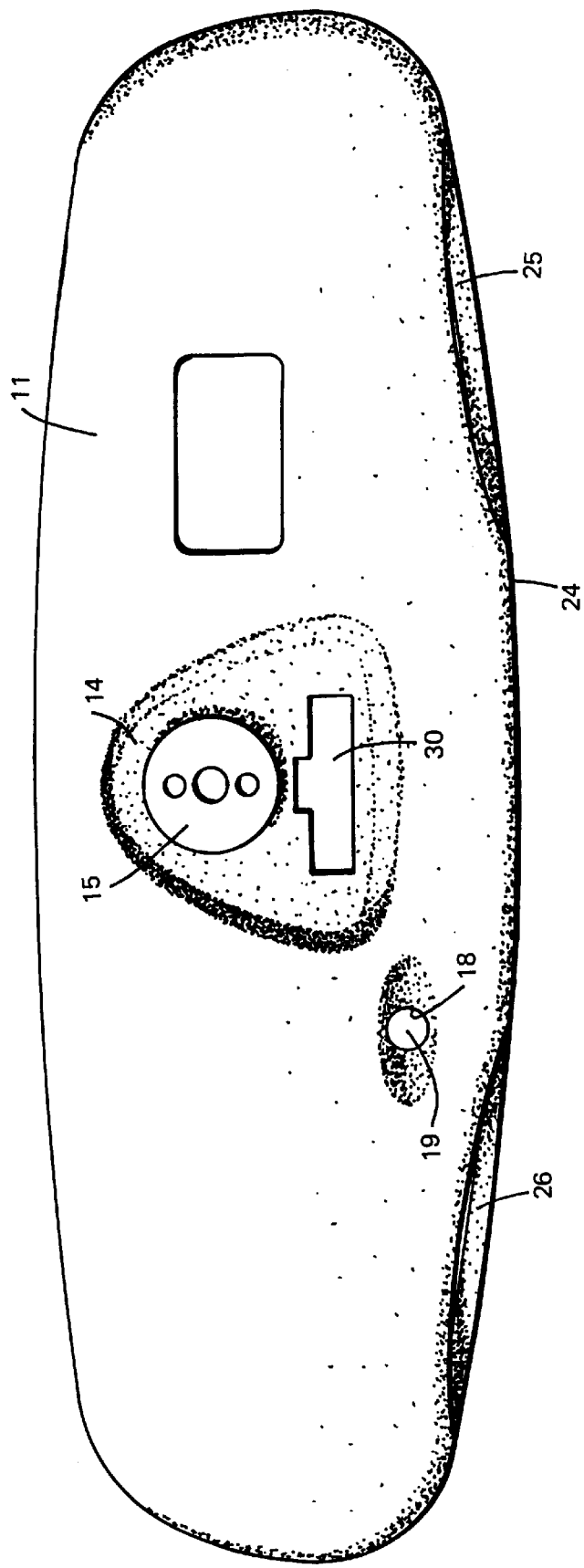
FIG. 2 is a rearview of the mirror assembly of FIG. 1.
Figure 3:
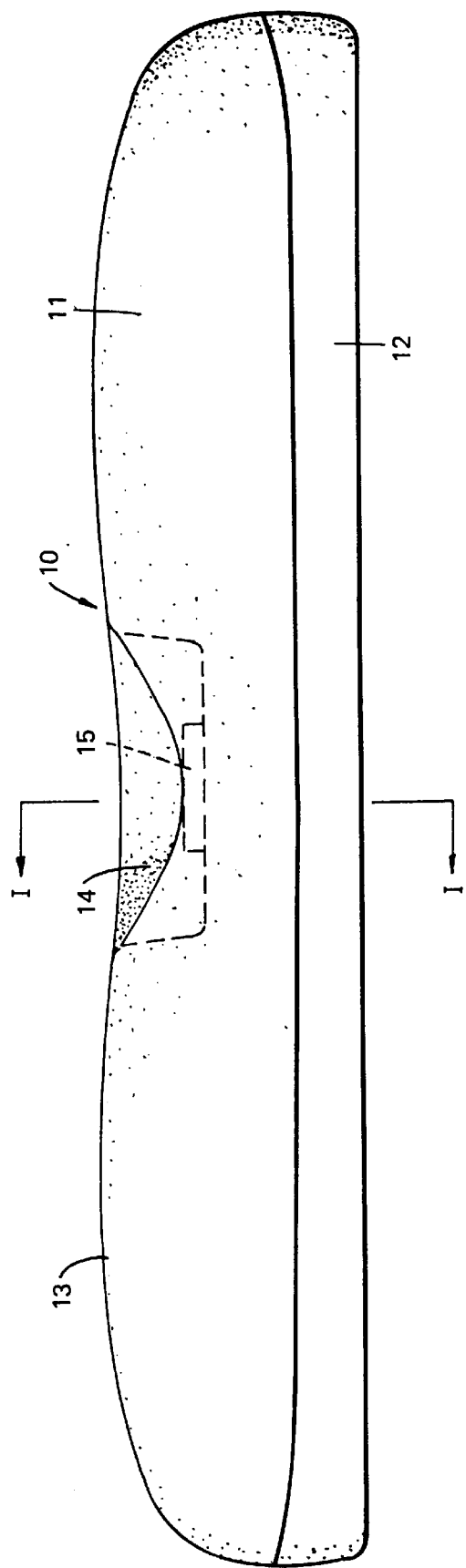
FIG. 3 is a top plan view of the mirror assembly of FIG. 1.

Referring now to the drawings and in particular to FIGS. 1–6 there is shown therein one embodiment of a mirror assembly generally indicated at 10 according to the invention. The mirror assembly 10 comprises a mirror case 11 having a front bezel 12 and a reflective element 100 secured together in a conventional manner.

The mirror case 11 is moulded from resinous plastic material, preferably a fibre reinforced nylon plastic or an ABS plastic, or polypropylene, or other similar thermoplastic or thermoset material. The bezel or rim 12 is similarly moulded. The rear surface 13 of the case 11 has a recessed area 14 in which is disposed a mounting boss 15 to which a conventional support arm 16 (FIG. 6) is fixed to enable the mirror assembly 10 to be mounted in a vehicle (not shown). The support arm 16 is of the double ball type known in the art having a break-away bracket 17.

It will be appreciated however that any suitable type of support arm may be employed for supporting the mirror assembly 10 within a vehicle. Thus, for example, the support arm may be of the type described in European Patent Specification No. 0 615 882 A2 published Sep. 21, 1994 the contents of which are incorporated herein by reference and the mirror case 11 may also be similar to the construction of case shown therein.

Also, breakaway assembly 17 and support arm may take one of several forms such as that described and shown in co-pending U.S. Pat. No. 5,615,857 or in U.S. Pat. No. 5,100,095 the disclosures of both of which are also hereby incorporated by reference.

Reflective element 100 may be any of a wide variety of interior rearview mirrors including manually operated prismatic day/night mirrors as described in U.S. Pat. Nos. 4,826,289 and 4,936,533, electrically operated prismatic day/night mirrors as described in U.S. Pat. No. 4,948,242, electrically operated, compass mirrors such as described in U.S. Pat. No. 5,253,109, electrically operated, interior rearview mirrors incorporating map/reading lights, as described in U.S. Pat. Nos. 4,646,210, 4,733,336, 4,807,096 and 5,178,448 as well as electrically operated, automatically dimming mirrors as described in U.S. Pat. Nos. 4,793,690, 4,799,768, 4,886,960 and 5,193,029, preferably electrochromic mirrors utilizing either solid state elements or electrochemichromic elements as described in U.S. Pat. No. 5,659,423 or electrically operated memory interior rearview mirrors, or rearview mirror assemblies incorporating a low level light emitting source as described in U.S. Pat. No. 5,671,996, the disclosures of all of such Patents and Patent Applications being incorporated herein by reference.

The rear of case 11 is provided with an aperture 18 for a forward facing light sensor 19 and the bezel 12 is provided with apertures 20,21 for a rearward facing light sensor 22 and an LED 23 respectively, to indicate when the mirror is energized.

Further, the bottom 24 of the case 11 and bezel 12 accommodate lamp assemblies 25,26 as will be described in more detail below, in addition to switches 27, and 29 for operating the lamp assemblies 25,26 and a switch 28 for controlling operation of the mirror and the LED 23. An aperture 30 is also provided in the rear of the case 11 for receiving an electrical socket (not shown) which connects to an electrical terminal 31 mounted on a circuit board 32 (FIG. 9) contained within the mirror case 11.

Figure 7:
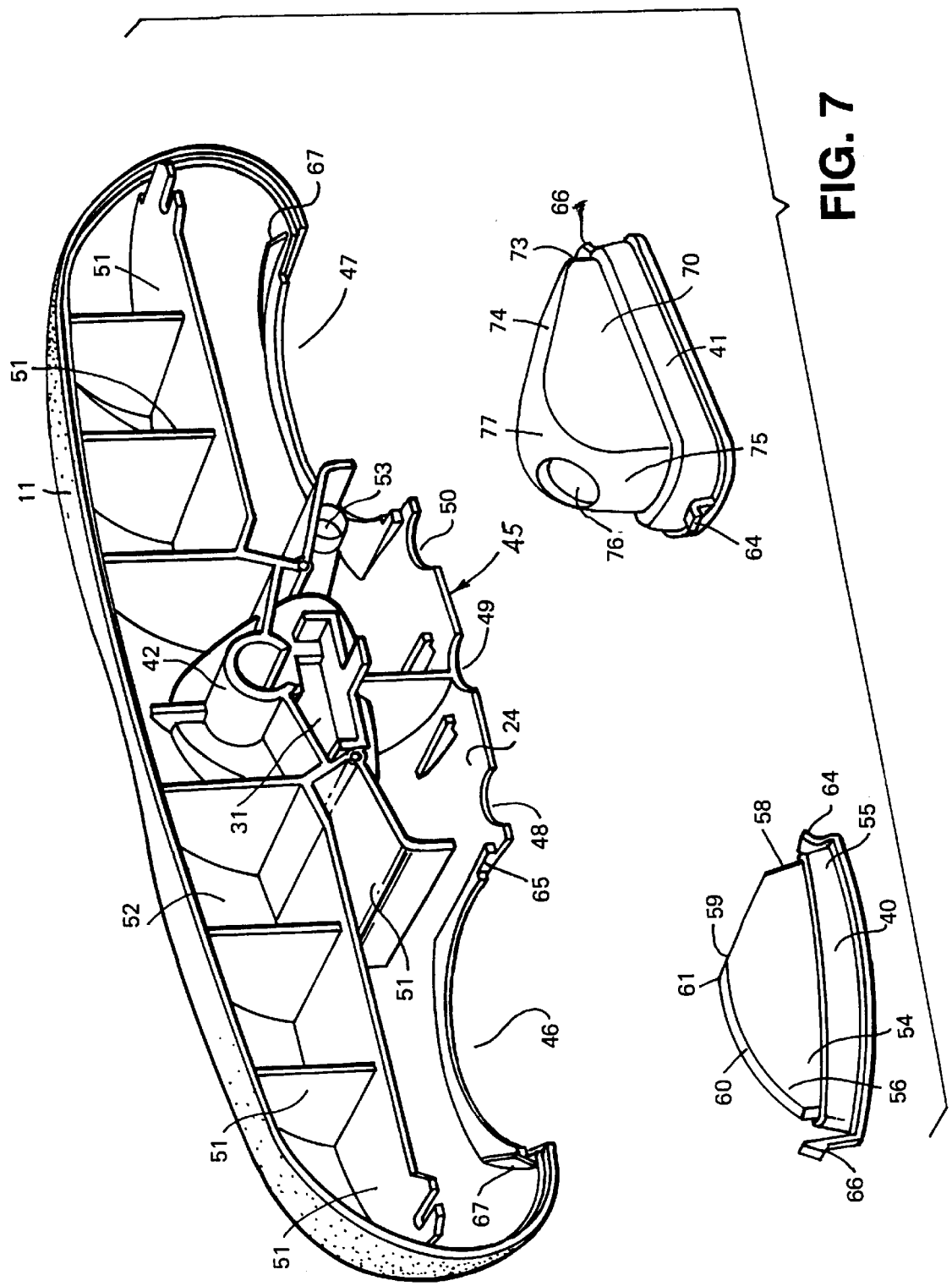
FIG. 7 is a front perspective view of the interior of the mirror casing of FIG. 1 and also showing the reflector members.
Figure 8:
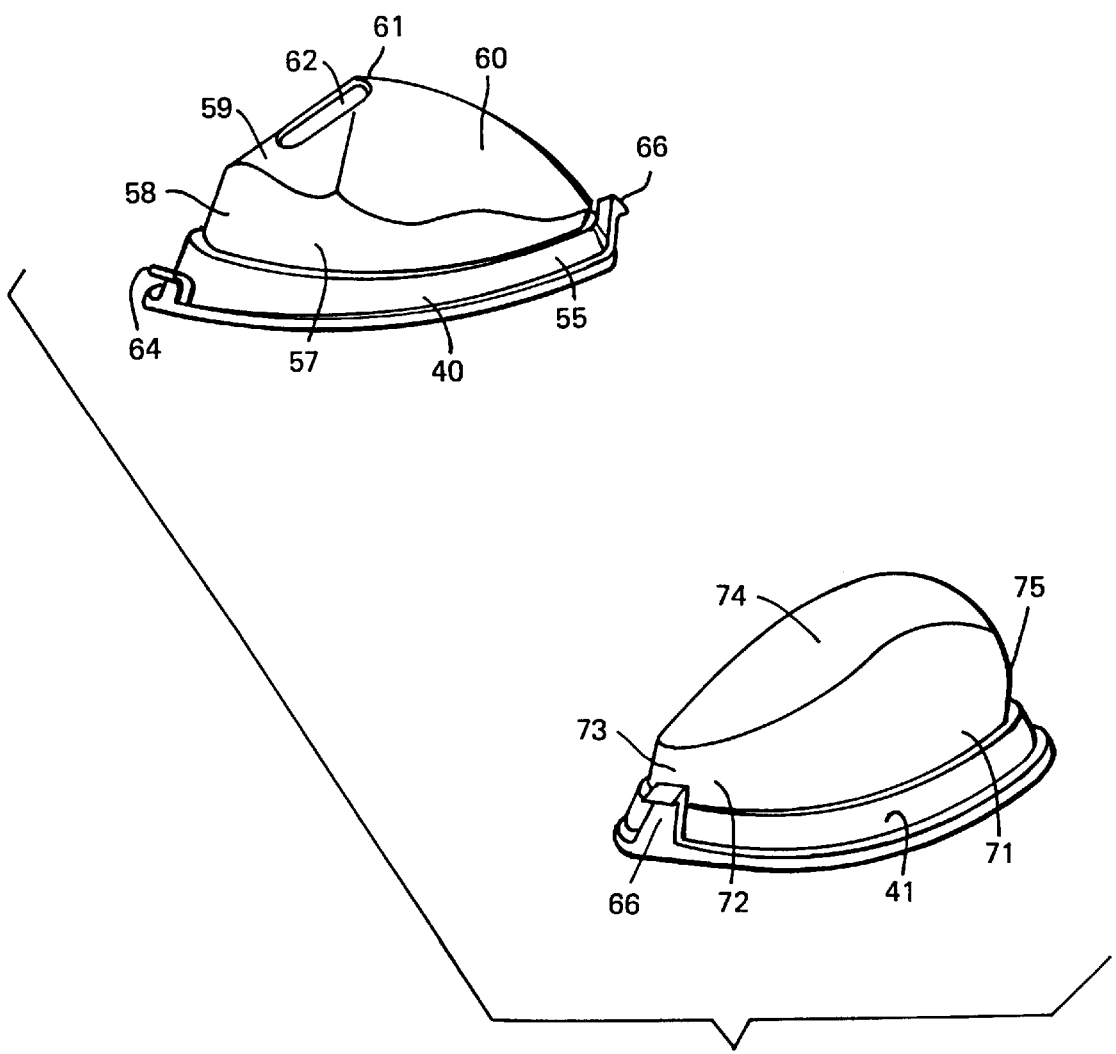
FIG. 8 is a rear perspective view of the reflector members of FIG. 7.

Referring now to FIG. 7 there is shown a front view of the mirror case 11 with the bezel 12 removed and also showing reflector members 40,41 of the lamp assemblies 25,26 respectively. The mirror case 11 has a part cylindrical socket 42 in which a screw 43 (FIG. 6) is received to mount the case 11 to a ball member 44 in a conventional support arm 16.

The bottom 24 of the case 11 is formed with recesses 46,47 for accommodating the reflector members 40,41 respectively.

Figure 4:
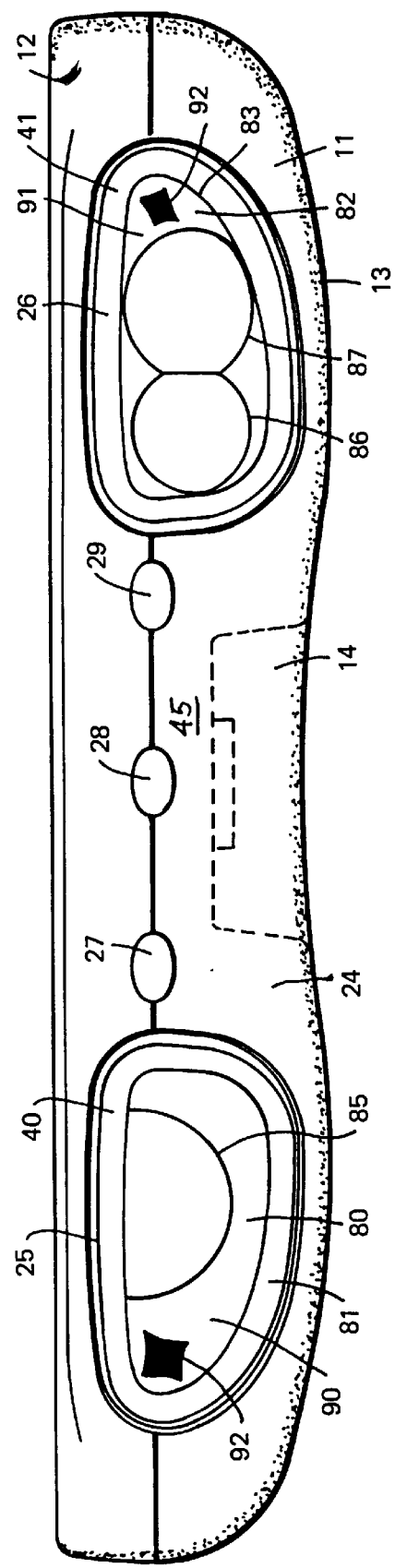
FIG. 4 is a bottom plan view of the mirror assembly of FIG. 1.
Figure 5:
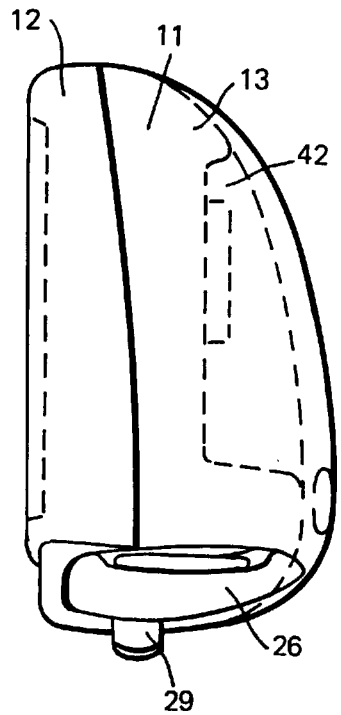
FIG. 5 is a right side view of the mirror assembly of FIG. 1.
Figure 6:
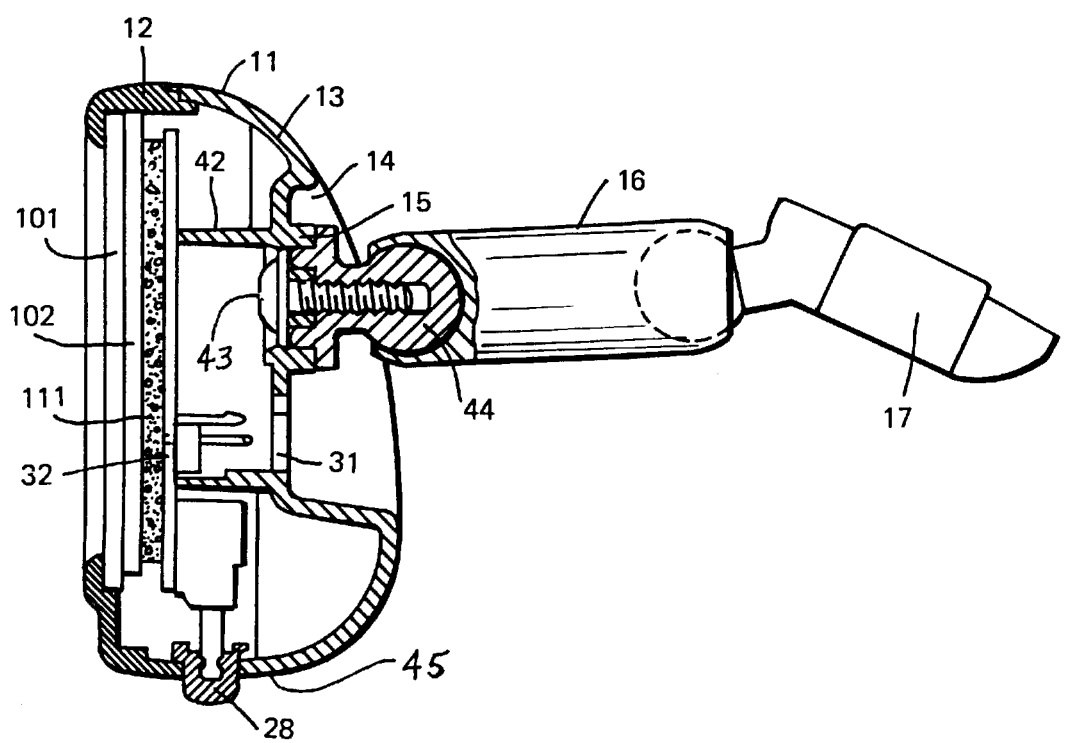
FIG. 6 is a cross-sectional view of the mirror assembly of FIG. 3 taken along lines I—I and viewed in the direction of the arrows, also showing a support arm.
Figure 9:
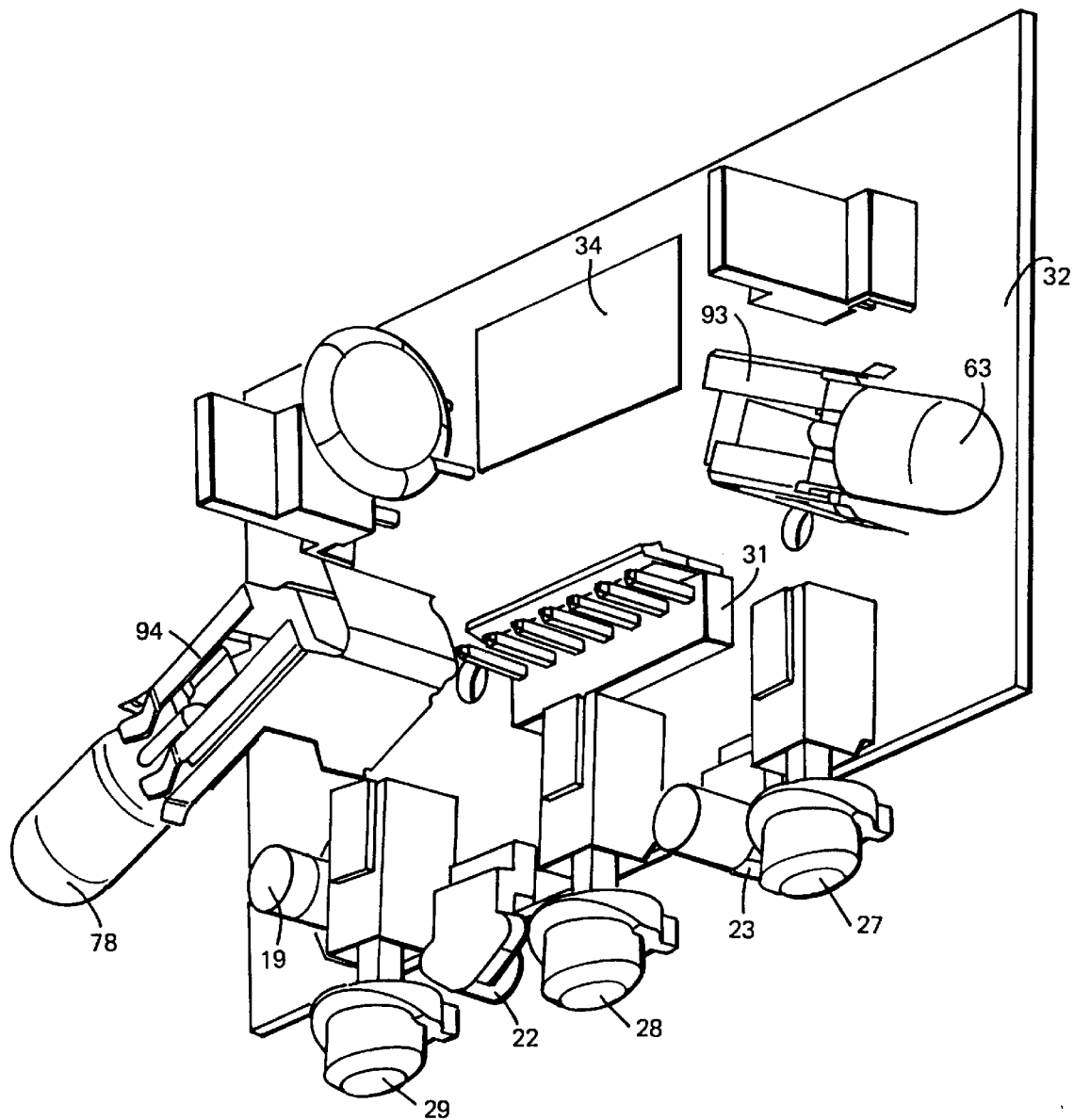
FIG. 9 is a perspective view of the circuit board carried within the mirror casing of FIG. 1.

In addition, the bottom 45 of the case 11 is provided with recesses 48,49,50 for accommodating the switches 27,28,29 respectively (FIGS. 1, 4 and 9). The interior of the mirror case 11 has a plurality of support flanges 51 integrally formed on the interior surface 52 of the case body 11, the flanges being arranged to provide support for a reflective element 100 to be described below. A hollow socket 53 is provided in the case body 11 to accommodate a forward facing light sensor 19 (FIG. 9), the socket 53 having the opening 18 in the rear of the case 11.

Figure 10:
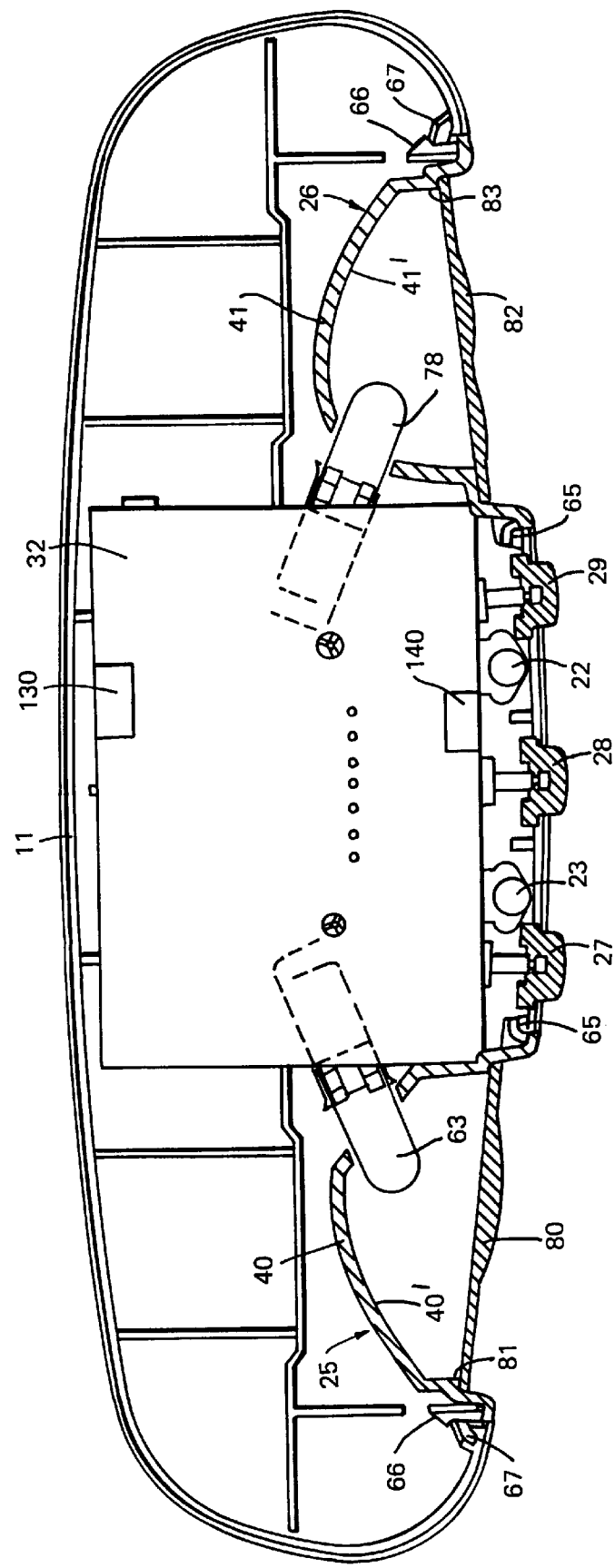
FIG. 10 is a front view of the mirror casing showing the circuit board and light reflectors in position.

The reflector 40 comprises a hollow plastics vacuum metalised member 54 having a peripheral flange 55 for engaging in the recess 46. The members 40,41 are hollow as shown in FIG. 10 and have interior surfaces 40',41' which are vacuum metalised to be light reflective. As shown the exterior surfaces of the reflector members 40,41 are substantially parallel to the interior surfaces 40',41'. Thus, the member 40 has a generally flat front wall 56 a generally flat rear wall 57, the rear wall 57 being of a substantially smaller height than the front wall. A first side wall 58 extends upwardly and slopes over the front and rear walls at 59. A generally concave topmost surface 60 extends between the front and rear walls and slopes downwardly from an uppermost region of the first side wall at 61 towards the peripheral flange 55. An aperture 62 is provided in the region of the front wall at 59 to receive a bulb 63 mounted on the circuit board 32. Also each member 40,41 has a lug 64 provided on the flange 55 to engage with a corresponding lug 65 on the case 11. Further a resilient flange 66 is provided on each member 40,41 to engage with a complementary flange 67 on the case 11 so that the members 40,41 can be releasably retained within the case 11.

The member 41 has a generally flat front wall 70, a generally flat rear wall 71, one side 72 of the rear wall 71 curving towards and joining the front wall 70 to define a first side wall 73. A generally concave topmost surface 74 extends between the front and rear walls and slopes upwardly from the first side wall 73; a second side wall 75 of generally concave shape joining the front and rear walls and extends upwardly and curves towards the topmost surface 74. An aperture 76 is provided in the region 77 where the topmost 74 and second side walls 75 merge together. The aperture 76 receives a light bulb 78 mounted on the circuit board 32.

The reflector member 40 has a lens 80 fixed as shown to an interior rim 81. The reflector member 41 has a lens 82 fixed to its interior rim 83. The lenses 80,82 are secured in place by sonic welding.

As shown, the lamp assembly 25 is for the driver's side on a left hand drive vehicle and the lamp assembly 26 is for the passenger side.

Figure 11:
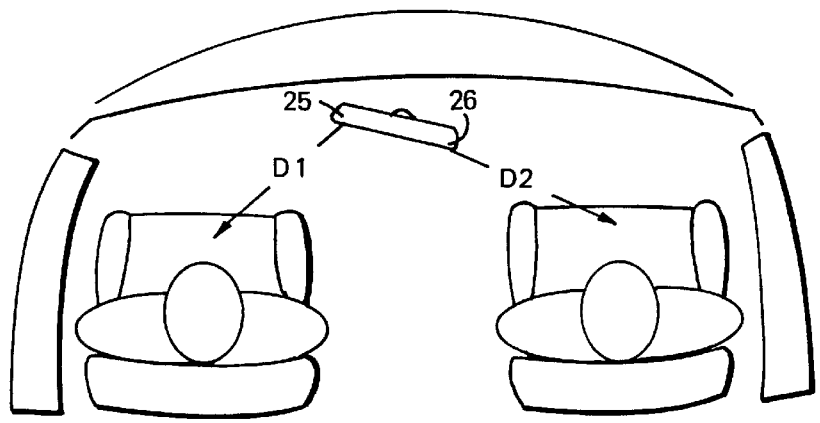
FIG. 11 is a diagrammatic plan view of a vehicle with the mirror in position.

As the mirror assembly is, in use, normally tilted towards the driver's side of a vehicle, but both the driver and the passenger will normally require light supply in similar locations, it is necessary that the reflector members are of different shapes to direct light to specified areas of both the driver's side and passenger side of a vehicle. Further, as shown diagrammatically in FIG. 11 the driver's side lamp assembly is required to direct light generally downwardly and rearwardly in the direction D1 whereas the passenger lamp assembly is required to direct light downwardly, but less rearwardly than the driver's side in the direction D2, since the passenger lamp assembly is nearer to the passenger than the driver's lamp assembly.

However the passenger lamp assembly must direct light in a more sideways direction than the driver's side lamp assembly. The particular shape of the reflector members 40,41 provides reflectors which direct light in the desired directions with the direction of the light being substantially controlled by the shape of the reflector members.

The lens 80 has a part circular focusing lens region 85 to focus light emanating from the lamp assembly 25 to a particular target area or region of interest in the direction defined by the reflector member 40. However it is to be noted that the primary purpose of the lens 80 is simply to focus the light at a particular target region or location and the lens 80 has substantially no part in determining the direction of the light but rather only focusing the light on the target area. Also, the lens 82 has two merging part circular focusing lens regions 86,87 to focus light emanating from the lamp assembly 26 to a particular target area in the passenger side of the vehicle, in a direction defined by the reflector member 41.

It will be appreciated therefore that control of the light direction is achieved almost exclusively by the reflectors 40,41. Controlling the light primarily through the reflectors, minimizes any light bending, shaping and diffusing required by the lenses 80,82 and significantly reduces undesirable stray and glaring light. With the present construction, because less light is diffused into unwanted areas, more light is now directed into the target region. This results in an optically efficient lamp assembly that has a significantly higher illumination level.

The target lighting area for both the passenger and driver's side will normally be specified by a distance forwardly and above the Hip or H point.

On the driver side, reflector 40 works in conjunction with the lens 80 to collect and direct light to the driver side target area. The driver side lens 80 is shaped and sized to redirect light from the area of reflector 40 close to the bulb 63 while allowing light off other areas of the reflector 40 to pass unaffected. This provides uniform illumination in the target area of interest. The lens 80 on the driver side is also offset to bend the light, not directly down, but towards the rear of the vehicle.

The passenger side lens 82 incorporates a twin prescription lens 86,87 so as to provide different shaping and directing properties for light emitting from different areas of the reflector. The lens surfaces also allow the collection and direction of the first incident light that is not directed towards the reflector. The lens 80,82 only slightly aid in directing the light but the primary element used in the direction and collection is the reflector.

It will be appreciated that some light will emanate from the lamp assemblies 25,26 through the areas 90,91 outside of the focussing lens regions 85,86,87. The light emanating from the regions 90,91 may be minimised or eliminated completely by making the regions or part of the regions 90,91 opaque. This may be done by pad printing, or another suitable means, to include certain selected parts of the lens 80,81 as is shown at 92.

As shown in FIGS. 9 and 10, the circuit board has mounted thereon suitable bulb holders or sockets 93,94 in which bulbs 63,78 respectively are held, so that the bulbs 63,78 project downwardly at an inclined angle into respective reflector members 40,41. The lamp bulbs preferably have a luminous intensity less than or equal to 5 Candela, and most preferably, less than or equal to 3 Candela. The circuit board 32 also has mounted thereon two electrical switches 27,29 for controlling the operation of the bulbs 63,78 respectively and a third switch 28 for controlling the operation of the reflective element of the mirror and optionally other features as will be described below. Further, other electrical components and circuitry will be contained on the circuit board as required by the particular reflective element which is used.

The circuit board 32 also has mounted thereon the rearward facing light sensor 22, a forward facing light sensor 19 and a LED 23 for indicating when the circuit is energized. The circuit board will be connected to the vehicle power supply.

Preferably, circuit board 32 also includes circuit elements 34 for control of the electrochromic function and/or for other functions and features such as information displays, compass display, security systems, navigation aids, windshield wiper controls, and headlamp activation controls. In addition to the operation of the mirror element, switch 28 also controls operation of one or more of these additional functions or features.

The circuit board 32 can be economically manufactured by an appropriate circuit board manufacturer and shipped to a rearview mirror assembler who can assemble the circuit board into mirror assembly 10.

Figure 12:
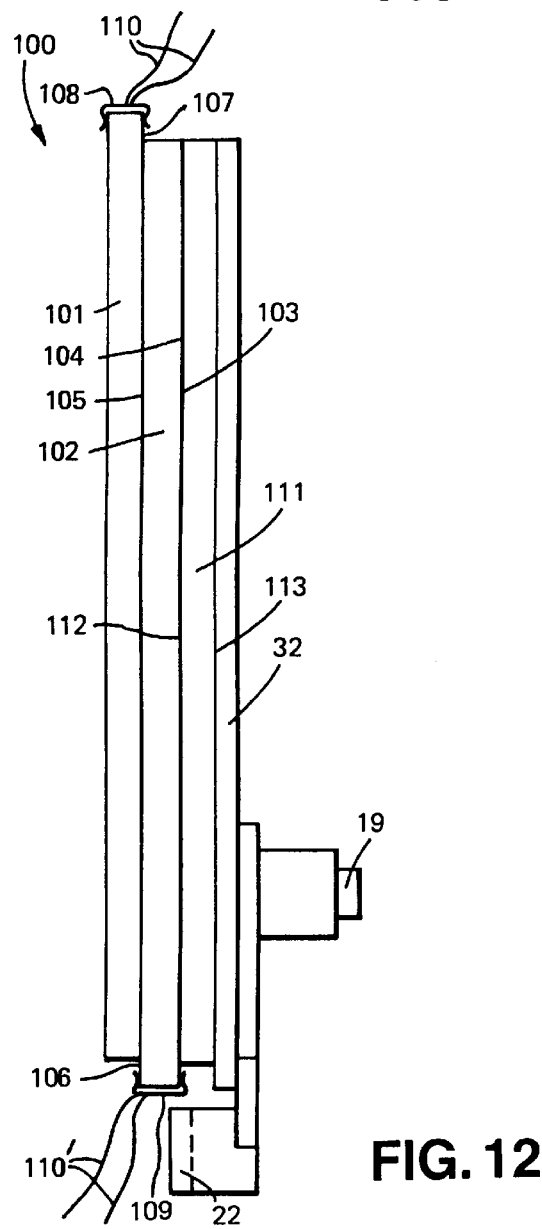
FIG. 12 is a cross-sectional view of the reflective element.

A cross section of a laminate type electro optic reflective element 100 is shown in FIG. 12, the element 100 optionally and preferably comprising a clear front glass 101 and a mirror 102 having a reflective coating 103 applied to its rear surface 104. As shown, the front glass 101 and mirror 102 are slightly offset relative to each other so that at the upper end, the mirror 102 projects below the front glass 101 and at the lower end the front glass 101 projects above the mirror 102. An electro-optic layer 105 is sandwiched in a space between the front glass 101 and the mirror 102 and extends onto the exposed front surface 106 of the mirror 102 at the lower end of the element and also onto the exposed rear surface 107 of the front glass 101 at the upper end of the element.

It will be appreciated that the front surface 106 of the mirror 102 and the rear surface 107 of the front glass 101 each have a transparent electronic conductor such as indium tin oxide or doped tin oxide or the like as conventionally known in the electro-optic device art. An electrical contact in the form of a metal connector strip 108 is secured to the top of the front class 101 so that it makes electrical contact with the electro-optic layer 105. Similarly, a further electrical contact in the form of a metal connector strip 109 is secured to the lower end of the mirror 102 so that another electrical contact is made with the electro-optic layer. The strips 108,109 are connected by leads 110,110' to a plug (not shown) which is in turn plugged into a socket (not shown) on the circuit board 32 as will be described.

A layer of foam material 111, is adhered to the rear surface of the mirror 102 preferably so as to cover substantially the entire rear surface (aside from where items such as through-the-cell photodetectors and information displays such as compass displays are mounted behind the mirror) . This foam layer 111 acts, as a resilient means or shock absorber means to reduce the risk of breaking of the front glass 101 and mirror 102 during an impact. The layer of foam material 111 is preferably a cross linked polyethylene foam sold under the name ALVEOLIT 3000 TA (2 mm thick) sold by Vita Cortex Ltd. of Cork, Ireland and is approximately 2 mm in thickness. This foam is sold having an adhesive layer applied to both its front 112 and rear 113 surfaces, these surfaces being covered by a removable sheet of protective foil (not shown) but described in EP-A-0,615,882 mentioned earlier. The protective foil on the front surface of the foam layer 111 is simply removed so that the adhesive layer is exposed and the layer of foam is applied to the rear surface of the mirror 102.

The foam material ill substantially extends at least to the central region of the mirror 102 and more preferably substantially covering the entire rear surface of the mirror. The foam material layer 111 may be cut to an exact shape, or the general shape or to any suitable generic shape and can be provided in a roll which has already been established while still attached to a backing material tape or sheet for example the protective foil. The thickness of the foam layer 111 is at least 0.5 mm more preferably at least 1 mm and most preferably at least 2 mm. The thickness of the foam layer 111 is preferably less than 5 mm more preferably less than 4 mm and most preferably less than 3 mm. The function of the foam layer 111 is to absorb energy from an impact with the mirror from, for example, a person or object in a vehicle to which the mirror is fitted, and also impact from an air bag in a vehicle. Additionally, the foam layer serves to provide an anti-scatter function in the event of breakage.

In completing the assembly, the circuit board 32 is located in the mirror case so that it abuts the flanges 51 in the mirror case 11. Also, a retaining means optionally in the form of one or more pins may be provided on the flanges, the pin(s) being a snap fit engagement in aperture(s) in the circuit board 32 to hold the circuit board 32 firmly in position. The protective foil is completely removed from the rear surface 113 of the foam layer 111 and the reflective element 100 is located in the bezel 12. The bezel 12 containing the reflective element 100 is then brought together with the mirror case 11 so that the rear surface 113 of the foam layer 111 then adheres to the flanges 51 and the circuit board 32 by the adhesive on the rear surface 113. The bezel 12 is secured to the mirror case 11 in conventional manner so that the final assembled mirror unit is as shown in FIG. 1 with the rearward facing light sensor 22 located within aperture 20 in the bezel 12. The user has simply to press the button upwards to energize the control circuit for the electro-optic layer.

When the bezel 12 is secured in place the foam layer 111 is slightly compressed by the flanges 51 so that the complete structure is quite compact and firmly retained. The flanges 51 provide additional shock absorbing properties for the reflective element as does the circuit board 32.

The electro-optic layer 105 may of course comprise any suitable or desirable material, for example electrochromic, liquid crystal or other materials which have desirable electro-optic properties. The foam layer of this invention is particularly useful with electrochromic rearview mirror devices, such as those described in U.S. Pat. No. 5,140,455 and U.S. Pat. No. 5,151,816 and European Application Nos. 92308022.0, or as described for example in the following papers: N. R. Lynam, "Electrochromic Automotive Day/ Night Mirrors", *SAE Technical Paper Series*, 870636 (1987); N. R. Lynam, "Smart Windows for Automobiles", *SAE Technical Parer Series*, 900419 (1990); N. R. Lynam and A. Agrawal, "Automotive Applications of Chromogenic Materials", *Large Area Chromogenics: Materials & Devices for Transmittance Control*, C. M. Lampert and C. G. Granquist, eds., Optical Eng'g Press, Washington (1990).

In another embodiment of the invention, one side of the circuit board 32 may be provided with two electrical contact pads 130,140 (FIG. 10) for connecting to the reflective element 100'. In this case, a spring contact (FIGS. 13,14) is provided to engage over the bottom of the front glass 101 and the top edge of the mirror 102. The spring contact 150 comprises a U-shaped portion 151 and an extension arm 152 having a spring portion 153. The edge 154 of the contact is serrated. As shown a similar spring contact is provided on the top part of the reflective element 100'. The serrated edges 154 of spring contacts 150 in use abut the respective pads 130,140 on the circuit board 32 so that the leads 110,110' in FIG. 12 may be dispensed with. In this arrangement therefore the reflective element is electrically connected to the circuit board 32 by the spring contacts 150 in a purely abutting contact manner. However, the arrangement provides increased reliability as there is no need for soldering leads 110,110'. In addition it will be clear from FIG. 13 that the metal connector strips 108,109 are engaged over the U-shaped portions of respective spring contacts 150.

Further, it will be noted that in the arrangement of FIG. 14 the front glass 101 projects lower than the mirror 102 at the lower end and at the top end the mirror 102 projects above the front glass 101, as compared with the arrangement in FIG. 12. Of course, either arrangement may be used as desired.

The invention is not limited to the embodiments described herein which may be modified or varied without departing from the scope of the invention.

We claim:

1. A rearview mirror assembly for a vehicle comprising:

a mirror case including a reflective element;

a support for mounting said rearview mirror assembly on a vehicle;

at least one lamp assembly having a light source and a reflector member to substantially direct light in a predetermined direction in the vehicle;

said rearview mirror assembly further including:

a circuit board mounted within said mirror case, said circuit board having at least one holder which holds said light source such that said light source projects into said reflector member; and a lens including at least two regions for passing light, one of said regions being a first prescription region which focuses light directed from said reflector member to a particular target area of the vehicle, and a second region having a prescription different from said first prescription region, said lens providing shaping and directing properties for light emitting from different areas of said reflector member.

2. A rearview mirror assembly for a vehicle as claimed in claim 1, wherein said lens is a twin prescription lens.

3. A rearview mirror assembly for a vehicle as claimed in claim 1 wherein said reflector member has an aperture for receiving said light source.

4. A rearview mirror assembly for a vehicle as claimed in claim 1 wherein said light source is a bulb.

5. A rearview mirror assembly for a vehicle as claimed in claim 4 wherein said bulb projects downwardly into said reflector member.

6. A rearview mirror assembly for a vehicle as claimed in claim 5 wherein said bulb projects downwardly at an inclined angle.

7. A rearview mirror assembly for a vehicle as claimed in claim 1 wherein said circuit board has a driver's side bulb holder and a passenger side bulb holder.

8. A rearview mirror assembly for a vehicle as claimed in claim 1 wherein said reflector member is removably mounted within said mirror case.

9. A rearview mirror assembly for a vehicle as claimed in claim 1 wherein said reflector member has at least one resilient flange for engaging a complementary flange in said mirror case to releasably mount said reflector member in said mirror case.

10. A rearview mirror assembly for a vehicle as claimed in claim 1 wherein said lens has a selected opaque area to reduce illumination in predetermined areas.

11. A rearview mirror assembly for a vehicle as claimed in claim 1 wherein said circuit board has mounted thereon at least one switch.

12. A rearview mirror assembly for a vehicle as claimed in claim 1 wherein said reflective element is actuatable between at least two reflective conditions.

13. A rearview mirror assembly for a vehicle as claimed in claim 1 wherein said reflective element is an electro-optic rearview mirror element.

14. A rearview mirror assembly for a vehicle as claimed in claim 13 wherein said electro-optic rearview element is an electrochromic element.

15. A rearview mirror assembly for a vehicle as claimed in claim 14 wherein a resilient means abuts a rear surface of said reflective element.

16. A rearview mirror assembly for a vehicle as claimed in claim 14 wherein a shock absorbing means abuts a rear surface of said reflective element.

17. A rearview mirror assembly for a vehicle as claimed in claim 16 wherein said shock absorbing means comprises a layer of foam material adhered to a rear surface of said reflective element.

18. A rearview mirror assembly for a vehicle as claimed in claim 17 wherein said foam material comprises a cross-linked polyethylene foam.

19. A rearview mirror assembly for a vehicle as claimed in claim 18 wherein said foam material has an adhesive rear surface.

20. A rearview mirror assembly for a vehicle as claimed in claim 19 wherein said circuit board is attached to said adhesive rear surface.

21. A rearview mirror assembly for a vehicle as claimed in claim 1 wherein said reflective element has a variable reflective condition; said circuit board containing an electrical circuit for controlling said reflective condition of said reflective element.

22. A rearview mirror assembly for a vehicle as claimed in claim 21 including driver's side and passenger side lamp assemblies; said circuit board having a first electrical switch for controlling said reflective condition of said reflective element and second and third electrical switches for controlling said driver's side and passenger side lamp assemblies.

23. A rearview mirror assembly for a vehicle as claimed in claim 1 wherein said lamp assembly is disposed on a bottom region of the mirror case.

24. A rearview mirror assembly for a vehicle as claimed in claim 1 including a first and a second lamp assembly.

25. A rearview mirror assembly for a vehicle as claimed in claim 24 wherein said first and second lamp assemblies comprise a driver's side lamp assembly and a passenger side lamp assembly respectively.

26. A rearview mirror assembly for a vehicle as claimed in claim 1 wherein an electrical spring contact is provided to electrically connect said circuit board to said reflective element.

27. A rearview mirror assembly for a vehicle as claimed in claim 26 including a flat electrical terminal on said circuit board; said spring contact abutting said flat electrical terminal on said circuit board.

28. A rearview mirror assembly for a vehicle as claimed in claim 1 wherein said reflector member comprises a metalised reflector member.

29. A rearview mirror assembly for a vehicle as claimed in claim 28 wherein said reflector member further comprises said lens mounted on said reflector member.

* * * * *

UNITED STATES PATENT AND TRADEMARK OFFICE
CERTIFICATE OF CORRECTION

PATENT NO. : 5,820,245
DATED : October 13, 1998
INVENTOR(S) : Desmond et al.

It is certified that error appears in the above-identified patent and that said Letters Patent is hereby corrected as shown below:

Title page,
Item [73], Assignee, should be -- Donnelly Mirrors Limited, Naas, County Kildare, Ireland --.

Column 6,
Line 38, "focussing" should be -- focusing --.

Column 7,
Line 30, "class 101" should be -- glass 101 --.
Line 58, "ill" should be -- 111 --.

Column 8,
Line 43, "*Parer*" should be -- *Paper* --.

Column 9,
Line 33, "is a twin prescription lens" should be -- includes a third region having a prescription different from the respective prescriptions of said first and second regions --.

Signed and Sealed this

Tenth Day of June, 2003

JAMES E. ROGAN
*Director of the United States Patent and Trademark Office*